United States Patent [19]

Connolly et al.

[11] Patent Number: 4,612,265

[45] Date of Patent: Sep. 16, 1986

[54] STABILIZATION OF SULFUR DIOXIDE SOLUTIONS CONTAINING LITHIUM PERCHLORATE AND A TETRAALKYLAMMONIUM PERCHLORATE

[75] Inventors: John F. Connolly, Glen Ellyn; Robert J. Thrash, Carol Stream; Richard A. Kretchmer, Clarendon Hills, all of Ill.

[73] Assignee: Amoco Corporation, Chicago, Ill.

[21] Appl. No.: 776,599

[22] Filed: Sep. 16, 1985

[51] Int. Cl.$^4$ ............................................. H01M 6/14
[52] U.S. Cl. ...................................... 429/196; 429/48; 429/198
[58] Field of Search .................. 429/196, 197, 198, 48

[56] References Cited

U.S. PATENT DOCUMENTS 3,578,500 5/1971 Maeicle et al. ...................... 429/196
4,520,083 5/1985 Prater et al. ......................... 429/101

*Primary Examiner*—Charles F. LeFevour
*Attorney, Agent, or Firm*—Richard A. Kretchmer; William T. McClain; William H. Magidson

[57] ABSTRACT

Solutions containing lithium perchlorate and a tetraalkylammonium perchlorate dissolved in liquid sulfur dioxide can be stabilized by the addition of a material selected from the group consisting of iodine, bromine, chlorine, iodide salts, bromide salts and chloride salts.

20 Claims, No Drawings

STABILIZATION OF SULFUR DIOXIDE SOLUTIONS CONTAINING LITHIUM PERCHLORATE AND A TETRAALKYLAMMONIUM PERCHLORATE

BACKGROUND OF THE INVENTION

1. Field of the Invention

This invention relates to a method for improving the stability of solutions which comprise lithium perchlorate and at least one tetraalkylammonium perchlorate salt dissolved in liquid sulfur dioxide. More particularly, it relates to a method for stabilizing such materials which involves the addition of minor amounts of a stabilizer.

2. Description of the Prior Art

A substantial amount of interest has recently been centered on the development of ambient temperature, high energy density, electrochemical cells which are light in weight and capable of providing a higher voltage than conventional cells such as nickel-camium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watt-hours per kilogram of all known active metals.

In conventional electrochemical cells, cathode depolarizers are used in a form which will permit an intimate and maximum contact with an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel, graphite or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell.

Electrolytes comprised of a solution of lithium perchlorate and one or more tetraalkylammonium perchlorate salts in liquid sulfur dioxide are highly satisfactory for use in rechargeable lithium-sulfur dioxide cells. We have found, however, that these solutions are unstable at high lithium perchlorate and tetraalkylammonium perchlorate salt concentrations. For example, a one molal solution of tetraalkylammonium perchlorate in liquid sulfur dioxide which is saturated with lithium perchlorate typically begins to decompose about one hour after preparation. This decomposition is observed as a yellowing of the solution and the gradual separation of a precipitate. Unfortunately, this decomposition limits the utility of such electrolytes in lithium-sulfur dioxide cells.

The above-mentioned U.S. Pat. No. 3,567,515 (Maricle et al.) discloses an electrochemical cell comprising a lithium anode, a cathode, and a nonaqueous conductive liquid electrolyte which comprises sulfur dioxide. This patent also discloses that the electrolyte may contain a plethora of electrolyte salts which include lithium perchlorate, lithium halides, tetra(loweralkyl)ammonium salts of halogens, and tetraalkylammonium perchlorates. Further, the patent also discloses that mixtures of two or more electrolyte salts can be used. However, the patent fails to disclose that certain solutions which comprise lithium perchlorate and one or more tetraalkylammonium perchlorate salts dissolved in liquid sulfur dioxide are unstable. Further, the patent fails to either suggest or disclose any method to increase the stability of such solutions.

SUMMARY OF THE INVENTION

The present invention is directed to the discovery that the stability of solutions which are comprised of lithium perchlorate and at least one tetraalkylammonium perchlorate dissolved in liquid sulfur dioxide can be improved by the addition of a stabilizer. Suitable stabilizers consist of at least one material selected from the group consisting of iodine, bromine, chlorine, iodide salts, bromide salts and chloride salts.

One embodiment of the invention is a method for stabilizing a nonaqueous conductive liquid, said liquid comprising a solution of lithium perchlorate and at least one tetraalkylammonium perchlorate salt in liquid sulfur dioxide, which comprises adding to said liquid a minor amount of a stabilizer which consists of at least one material selected from the group consisting of iodine, bromine, chlorine, iodide salts, bromide salts and chloride salts, wherein said solution is substantially saturated in lithium perchlorate, the tetraalkylammonium perchlorate salt concentration is at least about 0.1 molal, and the amount of said stabilizer is effective to increase the stability of said liquid.

Another embodiment of the invention is a nonaqueous conductive liquid which comprises a solution of lithium perchlorate, at least one tetraalkylammonium perchlorate salt and a stabilizer in liquid sulfur dioxide, wherein said stabilizer consists of at least one material selected from the group consisting of iodine, bromine, chlorine, iodide salts, bromide salts and chloride salts, and wherein said solution is substantially saturated in lithium perchlorate, the tetraalkylammonium perchlorate salt concentration is at least about 0.1 molal, and the amount of said stabilizer is in the range from about 5 ppm to about 5000 ppm.

A further embodiment of the invention is an electrochemical cell comprising in combination: (a) a lithium anode; (b) a cathode; and (c) a nonaqueous conductive liquid electrolyte which comprises a solution of lithium perchlorate, at least one tetraalkylammonium perchlorate salt and a stabilizer in liquid sulfur dioxide, wherein said stabilizer consists of at least one material selected from the group consisting of iodine, bromine, chlorine, iodide salts, bromide salts and chloride salts, and wherein said solution is substantially saturated in lithium perchlorate, the tetraalkylammonium perchlorate salt concentration is at least about 0.1 molal, and the amount of said stabilizer is in the range from about 5 ppm to about 5000 ppm.

An object of the invention is to provide an improved electrochemical cell.

Another object of the invention is to provide an improved electrolyte for use in lithium-sulfur dioxide electrochemical cells.

Another object of the invention is to provide an electrolyte for use in lithium-sulfur dioxide electrochemical cells which is of increased stability.

A further object of the invention is to provide a method for stabilizing sulfur dioxide solutions of lithium perchlorate and at least one tetraalkylammonium perchlorate salt.

DETAILED DESCRIPTION OF THE INVENTION

For reasons that are unclear, a solution comprised of lithium perchlorate and at least one tetraalkylammonium perchlorate dissolved in liquid sulfur dioxide is unstable at high concentrations of these solutes. For example, such a solution which is substantially saturated in lithium perchlorate and about 0.2 molal in tetraalkylammonium perchlorate is unpredictably unstable and undergoes decomposition on relatively rare and unpredictable occasions. However, when the tetraalkylammonium perchlorate concentration is increased to about 1.0 molal, decomposition reproducibly begins within about 1.5 hours.

We have found that the above-described instability can be either reduced or prevented through the addition of a minor amount of a stabilizer. Suitable stabilizers consist of at least one material selected from the group consisting of iodine, bromine, chlorine, iodide salts, bromide salts and chloride salts. Examples of suitable iodide, bromide and chloride salts include, but are not limited to, tetraalkylammonium iodides, bromides and chlorides and also the iodides, bromides and chlorides of lithium, sodium, potassium, rubidium, cesium, magnesium, calcium and strontium. However, lithium iodide, lithium bromide, lithium chloride and tetraalkylammonium iodides, bromides and chlorides are preferred salts. The quaternary ammonium cation associated with such tetraalkylammonium iodides, bromides and chlorides is preferably of the formula:

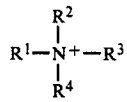

wherein $R^1$, $R^2$, $R^3$ and $R^4$ are independently selected from the group consisting of alkyl groups containing from 1 to 20 carbon atoms. More preferably, $R^1$, $R^2$, $R^3$ and $R^4$ are independently selected from the group consisting of alkyl groups having from 1 to 10 carbon atoms.

In the practice of this invention, the sulfur dioxide solution is substantially saturated in lithium perchlorate and the tetraalkylammonium perchlorate salt concentration is at least about 0.1 molal. As the concentration of tetraalkylammonium perchlorate is increased from about 0.1 molal, the solution stability decreases rapidly and is only on the order of about one hour at a concentration of about 1.0 molal. Accordingly, the value of the stabilizer of this invention becomes more pronounced at such higher tetraalkylammonium perchlorate concentrations.

Any tetraalkylammonium perchlorate salts having an adequate solubility in liquid sulfur dioxide are suitable for use in the practice of this invention. However, preferred salts are of the formula:

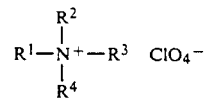

wherein $R^1$, $R^2$, $R^3$ and $R^4$ are independently selected from the group consisting of alkyl groups containing from 1 to 20 carbon atoms. More preferably, $R^1$, $R^2$, $R^3$ and $R^4$ are selected from the group consisting of alkyl groups having from 1 to 10 carbon atoms.

The stabilizer of this invention is used in an amount which is effective to increase the stability of the sulfur dioxide solution of lithium perchlorate and tetraalkylammonium perchlorate. Preferably, the amount of stabilizer will be in the range from about 5 ppm to about 5000 ppm, and more preferably from about 10 ppm to about 1000 ppm.

One embodiment of the invention is the use of the stabilized sulfur dioxide solution of lithium perchlorate and tetraalkylammonium perchlorate as an electrolyte in a lithium-sulfur dioxide electrochemical cell.

The lithium metal anode of the electrochemical cell of this invention can be constructed in any of the conventional forms, such as foil, plates, rods, films, powders, compacts or screens, and can be used alone or in combination with either conducting or nonconducting substrates. However, the use of a conducting substrate is not usually preferred since a simultaneous contact of both substrate and active metal with the electrolyte can cause an undesirable self-discharge of the electrode.

The cathode of the electrochemical cell can be constructed of any material which is electrically conducting and is substantially inert to the electrolyte system. In addition, the cathode material is desirably catalytic with respect to electroreduction of sulfur dioxide, the cathode depolarizer. Preferred materials include metals of the platinum group family, consisting of platinum, iridium, osmium, palladium, rhodium and ruthenium; carbon in any of its common electrode forms such as sintered, compacted or powdered graphite or carbon rod; iron in its various forms, particularly as stainless steel; titanium, nickel, silver, mercury, lead and gold. Less preferred materials are metals of the families of vanadium, chromium and manganese [Groups 5b, 6b and 7b of the Periodic Table of Elements (*Handbook of Chemistry and Physics*, 57th ed., 1976-77, P. B-4)]; zirconium, cobalt, copper, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like.

The electrolyte for use in the electrochemical cell of this invention comprises sulfur dioxide as the cathode depolarizer which is electrochemically reduced at the surface of the cathode during discharge of the electrochemical cell. In the absence of any surface contamination on the lithium anode which can initiate self-discharge, the cathode depolarizer is stable when in contact with this electrode. Although the reasons for this are not well understood, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction of the lithium anode to take place during operation of the cell by passage of lithium cations through the film. At the same time, sulfur dioxide reduction products are formed at the cathode during discharge of the cell.

The electrolyte for use in the electrochemical cell of this invention can comprise one or more electrolyte salts in addition to the sulfur dioxide, lithium perchlorate, tetraalkylammonium perchlorate and stabilizer of this invention. When such additional electrolyte salts are used, they are utilized in amounts which are effective to provide improved conductivity and more efficient operation of the electrochemical cell. Excluding lithium perchlorate, tetraalkylammonium perchlorates, and the iodide, bromide and chloride salts, suitable additional electrolyte salts include, but are not limited to, alkali metal salts, alkaline earth metal salts, salts containing metal cation complexes, quaternary ammonium salts, phosphonium salts, pyridinium salts and arsonium salts.

The electrolyte for use in the electrochemical cell of this invention can comprise, in addition to sulfur dioxide, one or more liquid organic or inorganic cosolvents which lack acidic hydrogen atoms and contain one or more atoms having at least one unshared pair of electrons. For the purposes hereof, "acidic hydrogen atoms" are those which are capable of being readily abstracted by the active metal electrode. However, strongly basic cosolvents such as amines are not generally desirable.

More specifically, suitable cosolvents are organic or inorganic liquids which contain at least one element which is selected from Groups 3a, 4a, 5a and 6a of the Periodic Table [*Handbook of Chemistry and Physics*, 57th ed. (1976-77), p. B-4]. Preferred elements from this group include, for example, boron, silicon, nitrogen, phosphorus, oxygen and sulfur as well as combinations of these elements. Organic solvents which contain two or more atoms of such elements in each molecule are particularly suitable.

Preferred liquid organic compounds for use as a cosolvent in the practice of this invention include, but are not limited to, trialkyl borates, boronic acid esters, borinic acid esters, tetraalkyl silicates, alkylalkoxyl silanes, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxy ethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol dimethyl ether, acetic anhydride, dimethyl sulfate, dimethyl sulfite, ethylene sulfite, and tetramethylene sulfone.

The following examples are intended only to illustrate the invention and are not to be construed as imposing limitations on it.

EXAMPLE I

A 1.11 molal solution of tetrabutylammonium perchlorate in liquid sulfur dioxide was saturated with lithium perchlorate at room temperature by stirring for one hour at room temperature in the presence of excess lithium perchlorate. Within ten to fifteen minutes after stirring was terminated, a yellow flocculent precipitate started to form at the liquid-vapor interface. Over the next twenty minutes, the precipitate gradually extended down to the bottom of the container. After standing overnight, a fluffy, voluminous, white precipitate, easily distinguishable from undissolved lithium perchlorate, had formed on the bottom of the container and the solution was very yellow in color. After standing for one week at room temperature, the solution had turned to a milky white color. When such a decomposing solution is utilized as an electrolyte in an electrochemical cell which contains a lithium anode and a porous carbon cathode current collector, the open-circuit voltage of the cell is greater than about 4 volts and erratic.

EXAMPLE II

The procedure set forth in Example I was repeated except that the solution was 1.02 molal in tetrabutylammonium perchlorate and contained 30 ppm of lithium iodide. The resulting solution (in the presence of undissolved lithium perchlorate) remained stable during a 105-day observation period without any trace of precipitate formation or yellowing.

EXAMPLE III

The procedure set forth in Example I was repeated except that the solution was 1.06 molal in tetrabutylammonium perchlorate and contained 200 ppm of lithium iodide. The resulting solution (in the presence of undissolved lithium perchlorate) remained stable during a 103-day observation period without any trace of precipitate formation or yellowing.

EXAMPLE IV

The procedure set forth in Example I was repeated except that the solution was 1.00 molal in tetrabutylammonium perchlorate and contained 300 ppm of lithium iodide. The resulting solution (in the presence of undissolved lithium perchlorate) remained stable during a 17-day observation period without any trace of precipitate formation or yellowing. A lithium foil anode and a porous carbon cathode current collector (composed of 15% Teflon and 85% Shawinigan black) were immersed in the solution during the observation period and, the open-circuit voltage of the resulting electrochemical cell was monitored during the first ten days of the observation period and found to be stable at 2.9 volts.

EXAMPLE V

The procedure set forth in Example I was repeated except that the solution was 1.08 molal in tetrabutylammonium perchlorate and contained 93 ppm of tetrabutylammonium iodide. The resulting solution (in the presence of undissolved lithium perchlorate) remained stable during a 23-day observation period without any trace of precipitate formation or yellowing.

EXAMPLE VI

The procedure set forth in Example I was repeated except that the solution was 1.05 molal in tetrabutylammonium perchlorate and contained 37 ppm of iodine. The resulting solution (in the presence of undissolved lithium perchlorate) remained stable during a 24-day observation period without any trace of precipitate formation or yellowing.

EXAMPLE VII

The procedure set forth in Example I was repeated except that the solution was 1.10 molal in tetrabutylammonium perchlorate and contained 107 ppm of lithium bromide. The resulting solution (in the presence of undissolved lithium perchlorate) remained stable during a 22-day observation period without any trace of precipitate formation or yellowing.

EXAMPLE VIII

The procedure set forth in Example I was repeated except that the solution was 1.04 molal in tetrabutylammonium perchlorate and contained 100 ppm of lithium chloride. The resulting solution (in the presence of undissolved lithium perchlorate) remained stable during a 31-day observation period without any trace of precipitate formation or yellowing.

EXAMPLE IX

The procedure set forth in Example I was repeated except that the solution was 1.00 molal in tetrabutylammonium perchlorate and contained 100 ppm of lithium sulfate. After three days, the resulting solution (in the presence of undissolved lithium perchlorate) turned yellow and began to deposit a precipitate. Accordingly, this demonstrates that lithium sulfate does not function as a satisfactory stabilizer.

We claim:

1. A method for stabilizing a nonaqueous conductive liquid, said liquid comprising a solution of lithium perchlorate and at least one tetraalkylammonium perchlorate salt in liquid sulfur dioxide, which comprises adding to said liquid a minor amount of a stabilizer which consists of at least one material selected from the group consisting of iodine, bromine, chlorine, iodide salts, bromide salts and chloride salts, wherein said solution is substantially saturated in lithium perchlorate, the tetraalkylammonium perchlorate salt concentration is at least about 0.1 molal, and the amount of said stabilizer is effective to increase the stability of said liquid.

2. The method as set forth in claim 1 wherein the amount of said stabilizer is in the range from about 5 ppm to about 5000 ppm.

3. The method as set forth in claim 2 wherein the amount of said stabilizer is in the range from about 10 ppm to about 1000 ppm.

4. The method as set forth in claim 2 wherein said stabilizer is selected from the group consisting of iodine, lithium iodide, lithium bromide, lithium chloride, tetraalkylammonium iodides, tetraalkylammonium bromides and tetraalkylammonium chlorides.

5. The method as set forth in claim 4 wherein said stabilizer is selected from the group consisting of iodine, lithium iodide, lithium bromide, lithium chloride, and tetraalkylammonium iodides.

6. The method as set forth in claim 2 wherein said tetraalkylammonium perchlorate has the formula:

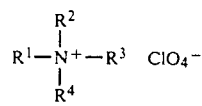

wherein $R^1$, $R^2$, $R^3$ and $R^4$ are independently selected from the group consisting of alkyl groups of from 1 to 10 carbon atoms.

7. The method as set forth in claim 6 wherein said tetraalkylammonium perchlorate is tetrabutylammonium perchlorate.

8. A nonaqueous conductive liquid which comprises a solution of lithium perchlorate, at least one tetraalkylammonium perchlorate salt and a stabilizer in liquid sulfur dioxide, wherein said stabilizer consists of at least one material selected from the group consisting of iodine, bromine, chlorine, iodide salts, bromide salts and chloride salts, and wherein said solution is substantially saturated in lithium perchlorate, the tetraalkylammonium perchlorate salt concentration is at least about 0.1 molal, and the amount of said stabilizer is in the range from about 5 ppm to about 5000 ppm.

9. The nonaqueous conductive liquid as set forth in claim 8 wherein the amount of said stabilizer is in the range from about 10 ppm to about 1000 ppm.

10. The nonaqueous conductive liquid as set forth in claim 8 wherein said stabilizer is selected from the group consisting of iodine, lithium iodide, lithium bromide, lithium chloride, tetraalkylammonium iodides, tetraalkylammonium bromides and tetraalkylammonium chlorides.

11. The nonaqueous conductive liquid as set forth in claim 10 wherein said stabilizer is selected from the group consisting of iodine, lithium iodide, lithium bromide, lithium chloride and tetraalkylammonium iodides.

12. The nonaqueous conductive liquid as set forth in claim 8 wherein said tetraalkylammonium perchlorate has the formula:

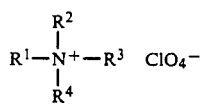

wherein $R^1$, $R^2$, $R^3$ and $R^4$ are independently selected from the group consisting of alkyl groups of from 1 to 10 carbon atoms.

13. The nonaqueous conductive liquid as set forth in claim 12 wherein said tetraalkylammonium perchlorate is tetrabutylammonium perchlorate.

14. The nonaqueous conductive liquid as set forth in claim 8 wherein the tetraalkylammonium perchlorate salt concentration is at least about 0.2 molal.

15. An electrochemical cell comprising in combination:
 (a) a lithium anode;
 (b) a cathode; and
 (c) a nonaqueous conductive liquid electrolyte which comprises a solution of lithium perchlorate, at least one tetraalkylammonium perchlorate salt and a stabilizer in liquid sulfur dioxide, wherein said stabilizer consists of at least one material selected from the group consisting of iodine, bromine, chlorine, iodide salts, bromide salts and chloride salts, and wherein said solution is substantially saturated in lithium perchlorate, the tetraalkylammonium perchlorate salt concentration is at least about 0.1 molal, and the amount of said stabilizer is in the range from about 5 ppm to about 5000 ppm.

16. The electrochemical cell as set forth in claim 15 wherein the amount of said stabilizer is in the range from about 10 ppm to about 1000 ppm.

17. The electrochemical cell as set forth in claim 15 wherein said stabilizer is selected from the group consisting of iodine, lithium iodide, lithium bromide, lithium chloride, tetraalkylammonium iodides, tetraalkylammonium bromides and tetraalkylammonium chlorides.

18. The electrochemical cell as set forth in claim 17 wherein said stabilizer is selected from the group consisting of iodine, lithium iodide, lithium bromide, lithium chloride and tetraalkylammonium iodides.

19. The electrochemical cell as set forth in claim 15 wherein said tetraalkylammonium perchlorate has the formula:

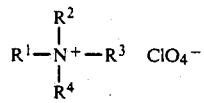

wherein $R^1$, $R^2$, $R^3$ and $R^4$ are independently selected from the group consisting of alkyl groups of from 1 to 10 carbon atoms.

20. The electrochemical cell as set forth in claim 15 wherein the tetraalkylammonium perchlorate salt concentration is at least about 0.2 molal.

* * * * *